United States Patent
Eguchi et al.

(10) Patent No.: US 7,734,458 B1
(45) Date of Patent: Jun. 8, 2010

(54) TRANSLATING APPARATUS HAVING DIFFERENT MODES FOR TRANSLATING AND OUTPUTTING DOCUMENT DATA

(75) Inventors: Tatsuya Eguchi, Toyohashi (JP); Yoshihiko Sezukuri, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 676 days.

(21) Appl. No.: 09/593,060

(22) Filed: Jun. 13, 2000

(30) Foreign Application Priority Data

Jun. 17, 1999  (JP) ................... 11-171316

(51) Int. Cl.
*G06F 17/28* (2006.01)
(52) U.S. Cl. ................... 704/2; 704/3; 704/5; 704/8
(58) Field of Classification Search ........ 704/2, 704/4–7, 9, 3, 8; 382/312, 100
See application file for complete search history.

(56) References Cited

U.S. PATENT DOCUMENTS

| | | | | |
|---|---|---|---|---|
| 5,442,782 A | * | 8/1995 | Malatesta et al. | 704/9 |
| 5,548,509 A | * | 8/1996 | Takagi | 704/9 |
| 5,612,872 A | * | 3/1997 | Fujita | 704/2 |
| 5,701,497 A | * | 12/1997 | Yamauchi et al. | 704/3 |
| 5,729,618 A | * | 3/1998 | Fujisawa et al. | 382/100 |
| 6,314,213 B1 | * | 11/2001 | Miyahara et al. | 382/312 |
| 6,370,498 B1 | * | 4/2002 | Flores et al. | 704/3 |

FOREIGN PATENT DOCUMENTS

| | | |
|---|---|---|
| JP | 5-81318 | 4/1993 |
| JP | 7-160152 | 6/1995 |
| JP | 8-127152 | 5/1996 |
| JP | 8-152771 | 6/1996 |
| JP | 10-154145 | 6/1998 |

* cited by examiner

*Primary Examiner*—Qi Han
(74) *Attorney, Agent, or Firm*—McDermott Will & Emery LLP

(57) ABSTRACT

A translating apparatus includes a translator for translating document data into another language, an output unit for outputting the translated document data translated by the translator, a mode setting unit for setting in a first mode or a second mode, and a controller. In a case where the first mode is set, the controller controls the translator so as to translate the document data into a plurality of languages, and controls the output unit so as to output the translated document data by each language group. In a case where the second mode is set, the controller controls the translator so as to translate the document data into a plurality of languages, and controls the output unit so as to output the translated document data by group including each translated language document date.

13 Claims, 18 Drawing Sheets

TRANSLATING APPARATUS HAVING DIFFERENT MODES FOR TRANSLATING AND OUTPUTTING DOCUMENT DATA

This application claims priority to Japanese Patent Application No. H11 (1999)-171316 filed on Jun. 17, 1999, the disclosure of which is incorporated by reference in its entirety.

BACKGROUND OF THE INVENTION

1. Field of the Invention

The present invention relates to a translating apparatus.

2. Description of Related Art

Conventionally, as this kind of apparatus, an apparatus shown in Japanese Unexamined Laid-open Patent publication No. H10 (1998)-154145 and an apparatus shown in Japanese Unexamined Laid-open Patent publication No. H8 (1996)-127152 are known. In the former apparatus, character sequences are extracted from image data and converted into text data, and then the text data are converted into another language text data. On the other hand, in the latter apparatus, an original language to be translated (hereinafter may be referred to as "before-translation-language") input by input means is translated into another language, and the original language and the translated language (hereinafter may be referred to as "after-translation-language") are double-sided printed based on layout information.

In the meantime, in accordance with recent rapid spread of Internet and international expansion of business environments, it is required to provide a translating apparatus which is capable of systematically processing the translation operation and the output operation such that an original single language is simultaneously translated into a plurality of other languages and that the translated languages are output in a sorted manner as required.

However, in the aforementioned former conventional apparatus, it is not considered to systematize the processes up to the outputting process of the translated languages. On the other hand, in the aforementioned latter conventional apparatus, it fails to refer that a single original language is translated into a plurality of other languages. Thus, neither of them can cope with the aforementioned demands. As a result, in a conference or the like requiring a multi-language processing, it took long hours of time for translating an original language document into various other languages.

SUMMARY OF THE INVENTION

It is an object of the present invention to provide a translating apparatus which can systematically perform various processes from a translation process up to an output process.

It is another object of the present invention to provide a translating apparatus which can perform various processes from a translation process for translating a single language data into a plurality of other languages up to an output process.

It is still another object of the present invention to provide a translating apparatus which can perform various processes from a translation process for translating data including a plurality of languages into at least one another language up to an output process.

According to a first aspect of the present invention, a translating apparatus comprises translating means for translating document data into another language, an output unit for outputting the translated document data translated by said translating means, a mode setting unit for setting the translating apparatus in a first mode or a second mode, and a controller. In a case where the first mode is set, the controller controls the translating means so as to translate the document data into a plurality of languages, and controls the output unit so as to output the translated document data by same language group. In a case where the second mode is set, the controller controls the translating means so as to translate the document data into a plurality of languages, and controls the output unit so as to output the translated document data by group including each translated language document data.

In the aforementioned translation apparatus, when the first mode is set, a single language data is translated into a plurality of languages, and the translated languages are output by each language group. When the second mode is set, a single language data is translated into a plurality of languages, and the translated document data are output by group including each translated language document data. Accordingly, by simply setting the translating apparatus in the first mode or the second mode, various operations from a translation operation for translating a single language data into a plurality of languages up to an output operation for printing the translated language data in a sorted manner are systematically performed.

According to a second aspect of the present invention, a translating apparatus comprises translating means for translating document data into another language, an output unit for outputting the translated document data translated by the translating means, a mode setting unit for setting the translating apparatus in a prescribed mode, and a controller. In a case where the prescribed mode is set, the controller controls the translating means so as to translate the document data including a plurality of languages into at least one language, and controls the output unit so as to output the translated document data.

In the aforementioned translating apparatus, when the prescribed mode is set, the document data including a plurality of languages are translated into at least one language and then the translated document data are output in the language. Therefore, by simply setting the translation apparatus in the prescribed mode, various operations from a translation operation for translating data including a plurality of languages into at least one language are systematically performed.

According to the third aspect of the present invention a translating apparatus comprises translating means for translating a first document data and a second document data into another language, an output unit for outputting the translated document data translated by the translating means, and a controller. The controller controls the translating means so as to translate each of the first document data and the second document data into a first language and a second language, and controls the output unit so as to output the first and second document data translated into the first language as a first group and the first and second document data translated into the second language as a second group.

In the aforementioned translating apparatus, each of the first and second document data are translated into the first and second document data, respectively, and the first and second documents translated into the first language and those translated into the second language are output by same language group.

According to the fourth aspect of the present invention, a translating apparatus comprises translating means for translating document data into another language, an output unit for outputting the translated document data translated by the translating means, an operation unit for setting the number to be output, and a controller. The controller controls the translating means so as to translate the document data into a first language and a second language, and controls the output unit so as to repeatedly output the document data translated into the first and second languages as a single group by the number to be output set by the operation unit.

In the aforementioned translating apparatus, the document data translated into the first language and those translated into the second language are output as a single group by the number to be output set by the operation unit.

According to the fifth aspect of the present invention, a translating apparatus comprises translating means for translating document data into another language, an output unit for outputting the translated document data translated by the translating means, and a controller. The controller controls the translating means so as to translate a first document data written in a first language and a second document data written in a second language into at least one language, and controls the output unit so as to output the translated first and second document data.

In the aforementioned translating apparatus, a first document data written in a first language and a second document data written in a second language are translated into at least one language and then output.

Other objects and the features will be apparent from the following detailed description of the invention with reference to the attached drawings.

BRIEF DESCRIPTION OF THE DRAWINGS

The present invention will be more fully described and better understood from the following description, taken with the appended drawings, in which.

DETAILED DESCRIPTION OF THE PREFERRED EMBODIMENTS

Figure 1:
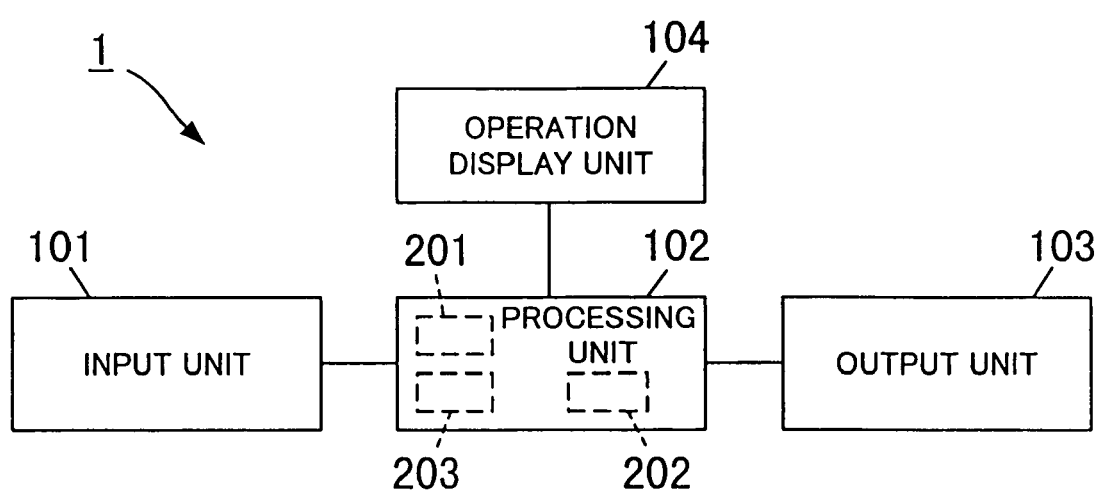
FIG. 1 is a block diagram showing a schematic view of the translating apparatus according to an embodiment of the present invention.

FIG. 1 is a block diagram showing a concept of a translating apparatus according to one embodiment of the present invention.

The translation apparatus 1 is provided with an input unit 101, a processing unit 102, an output unit 103 and an operation display unit 104.

The input unit 101 is used to input data, and includes a reading apparatus for reading a before-translation-language of an original document into the processing unit 102, an external computer for sending the input data as electric data to the processing unit 102, and other apparatuses. The operation display unit 104 is also used as a setting means by which a user selectively sets an after-translation-language and a selecting/setting means by which a user selectively sets one of translation modes including a normal mode, a group mode, a sort mode and a unification mode. The operation display unit 104 may be integrally formed with the operation panel or may comprise a display and a key board.

The processing unit 102 includes a translation portion 201 for translating an input before-translation-language into a selected after-translation-language, a control portion 202 for controlling the translation portion 201 and the output unit 103 in accordance with translation mode information and a memory portion 203 for temporally storing translation information. The processing unit 102 may be an external personal computer or may be built in the translation apparatus 1.

The output unit 103 outputs the data of after-translation-language as electric data or as printed articles on a sheet in accordance with the process of the processing unit 102.

The output unit 103 may be, for example, a printing apparatus for forming an image on a paper, a display for displaying an image, an interface unit for transmitting the data after translation to an external apparatus.

Figure 2:
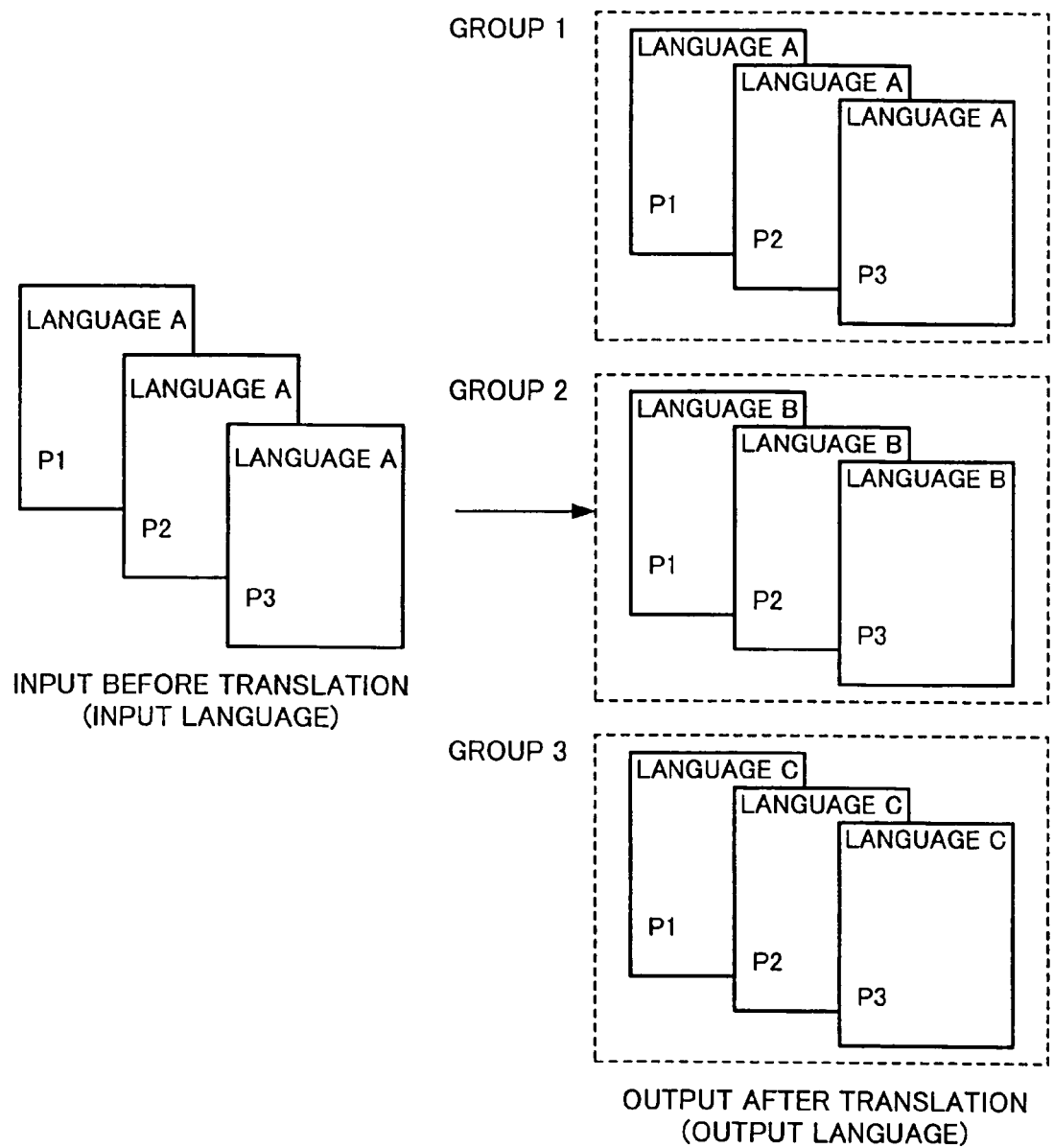
FIG. 2 illustrates an operation concept of the translating apparatus in a group mode.

FIG. 2 illustrates an operation concept of the translating apparatus 1 in a group mode.

For example, when three pages of document data of a single before-translation-language A is input by the input unit 101, the processing unit 102 performs a translation processing in accordance with an instruction concerning information on an after-translation-language setting and a group mode setting from the operation display unit 104. Then, the translated document data are sorted into a first group including an after-translation-language A, a second group including an after-translation-language B, a third group including an after-translation-language C, and so on, by language, and are output as electric information or printed articles via the output unit 103. Thus, an output grouped by each after-translation-language can be obtained.

Figure 3:
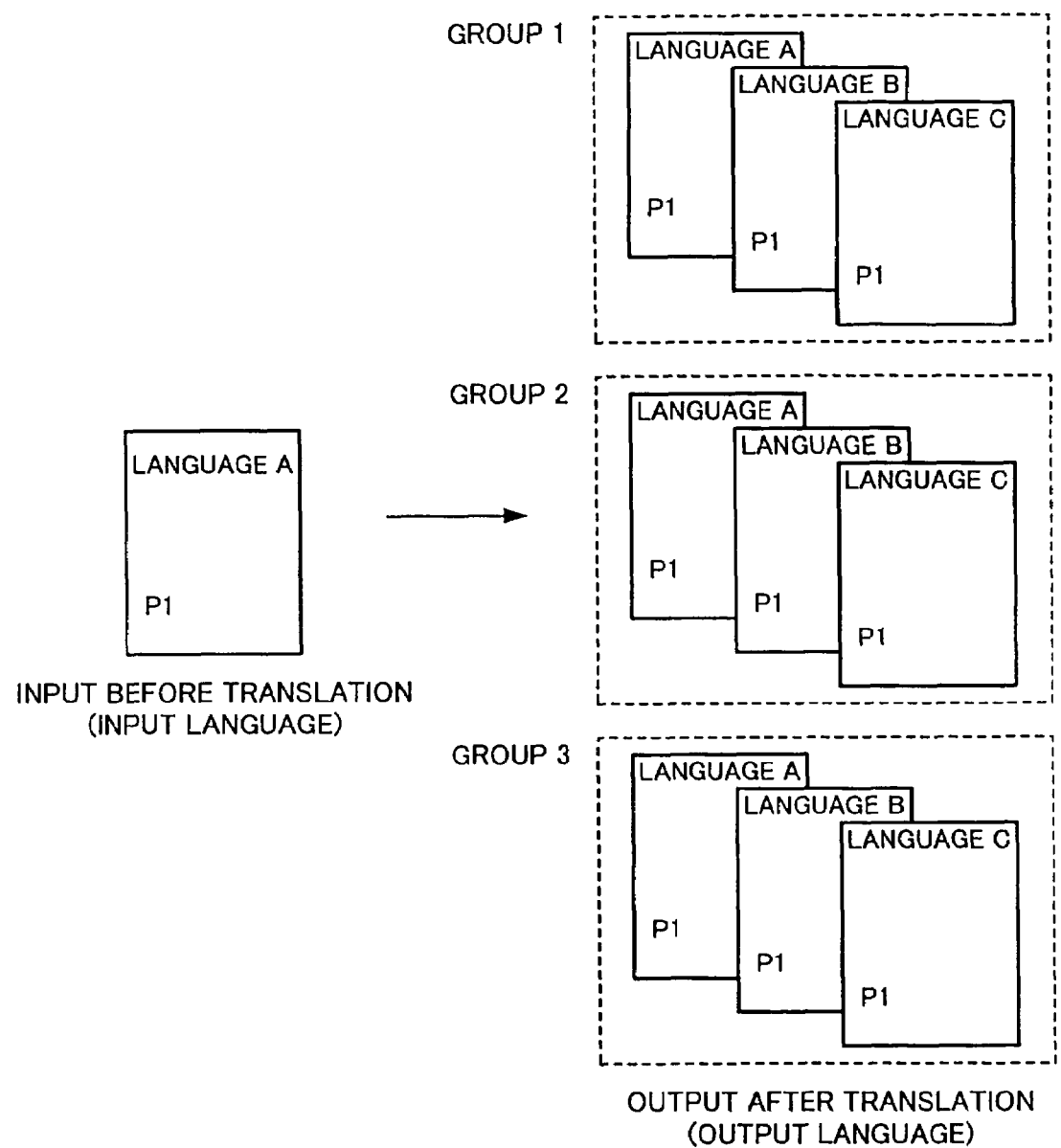
FIG. 3 illustrates an operation concept of the translating apparatus in a sort mode.

FIG. 3 illustrates an operation concept of the translating apparatus 1 in a sort mode.

When document data of one page including a single before-translation-language A are input by the input unit 101, the processing unit 102 performs a translation processing in accordance with instructions concerning information on an after-translation-language setting and a sort mode setting from the operation display unit 104. An example in which a plurality of after-translation-languages are set will be shown as follows. As shown in FIG. 3, each document data including the after-translation-languages A to C form a group, and one or plural sets thereof are output as electric information or printed documents via the output unit 103. Thus, sorted after-translation-languages can be obtained.

Figure 4:
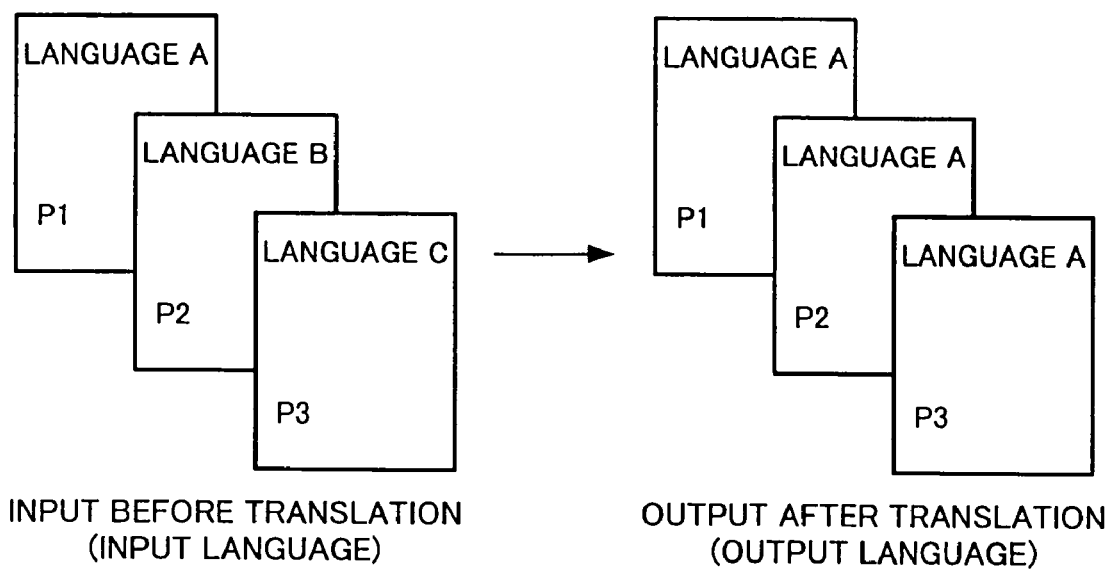
FIG. 4 illustrates a basic operation concept of the translating apparatus in a unification mode.

FIG. 4 illustrates a basic operation concept of the translating apparatus 1 in a unification mode.

When document data including different languages, i.e., a before-translation-language A on page 1, a before-translation-language B on page 2 and a before-translation-language C on page are input by the input unit 101, the processing unit 102 performs a translation processing in accordance with information on an after-translation-language setting and a unification mode setting from the operation display unit 104 such that each of the aforementioned languages is translated into a single language A. Then, the translated document data translated into the language A are output as electric information or printed articles via the output unit 103. Thus, a unified after-translation-language can be obtained.

Figure 5:
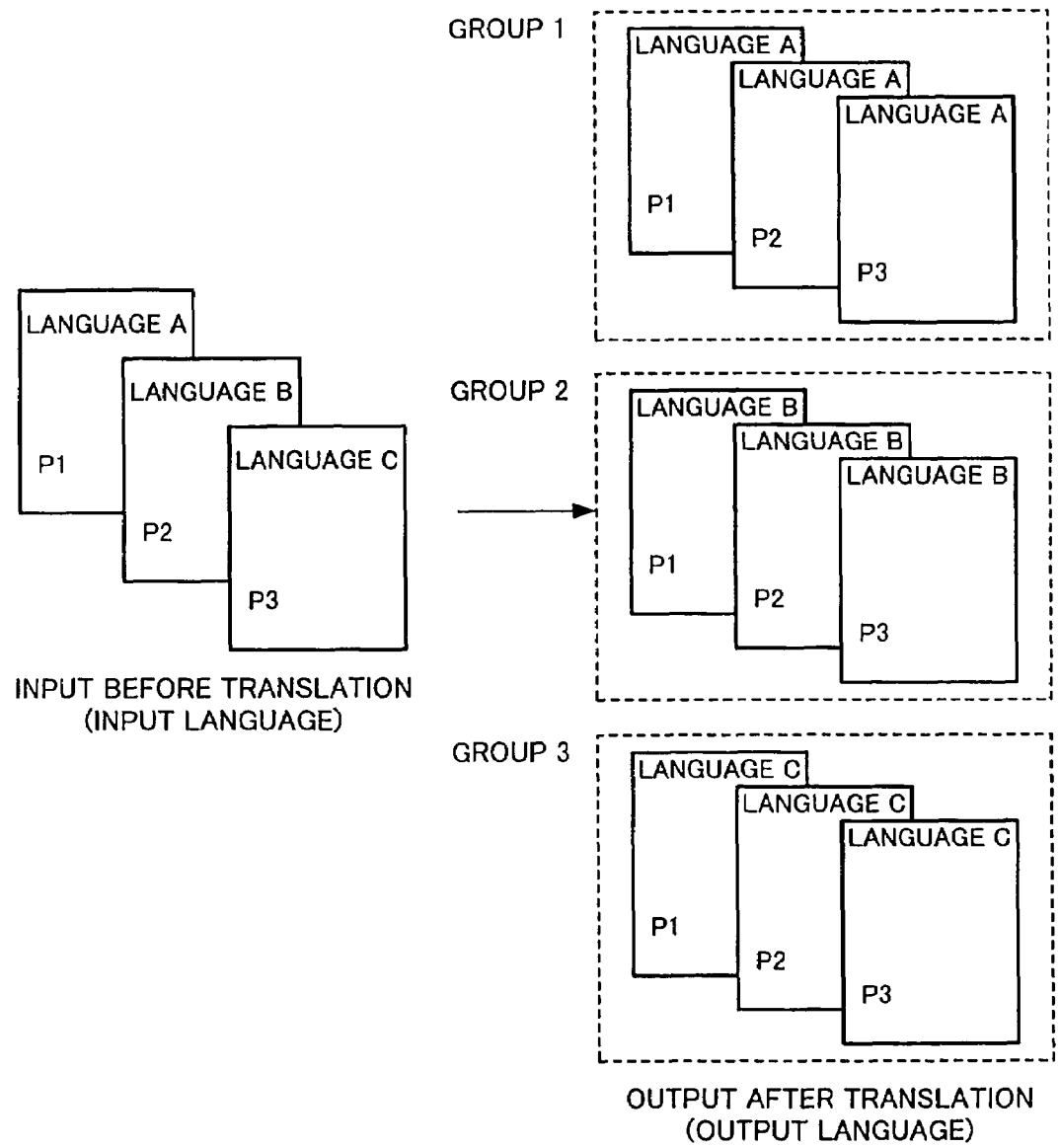
FIG. 5 illustrates an application operation concept of the translating apparatus in a unification mode.

FIG. 5 illustrates an application operation concept of the translating apparatus 1 in a unification mode.

When document data including different languages, i.e., a before-translation-language A on page 1, a before-translation-language B on page 2 and a before-translation-language C on page are input by the input unit 101, the processing unit 102 performs a translation processing in accordance with information on the after-translation-language setting and the unification mode setting from the operation display unit 104 such that each of the aforementioned languages is translated into each language A, B and C. Then, the translated document data translated into each of the languages A, B and C are output by each language group as electric information or printed articles via the output unit 103. Thus, a unified after-translation-language can be obtained.

In the meantime, in each mode, the processing unit 102 does not perform the translation processing in a case where the before-translation-language coincides with the after-translation-language.

Next, the image forming system to which the aforementioned translation apparatus is applied will be explained based on FIGS. 6 to 8.

Figure 6:
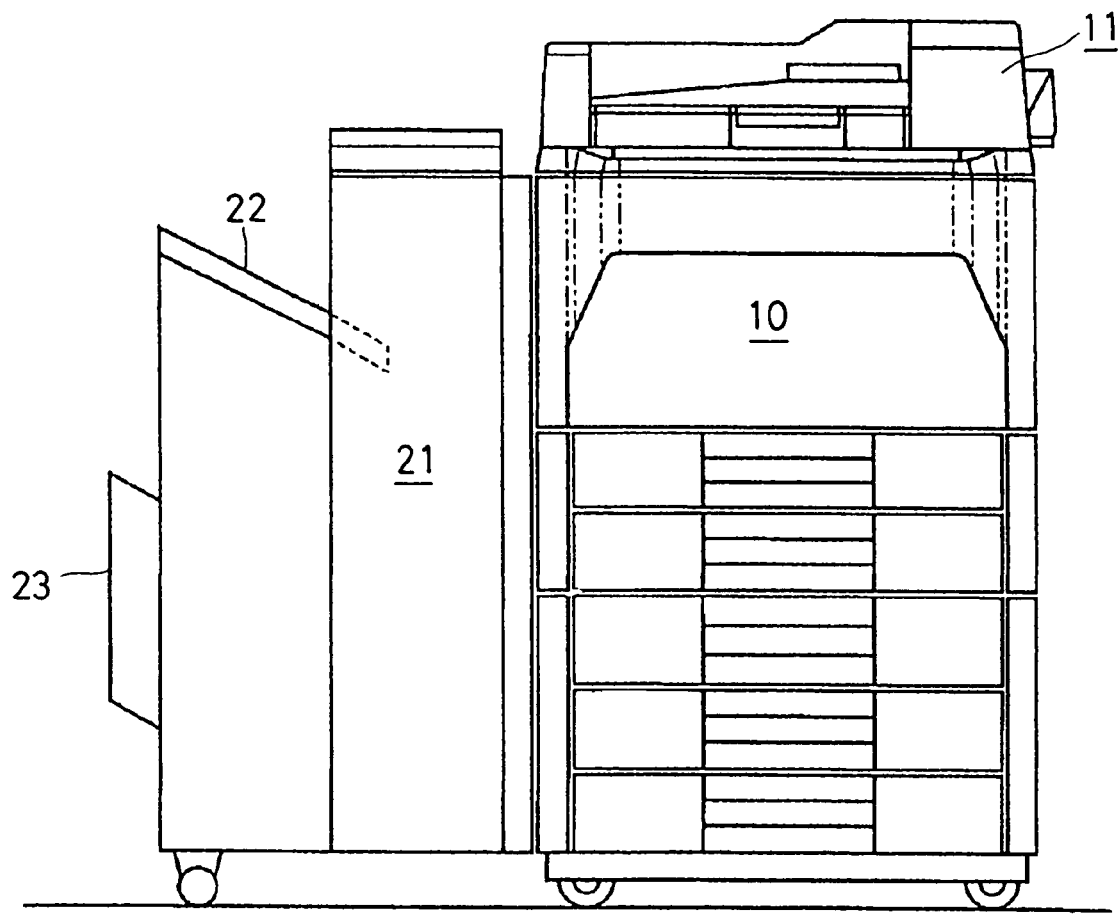
FIG. 6 is a schematic front view showing an image forming system equipped with a digital copying machine to which the translating apparatus is applied.

FIG. 6 is a schematic front view showing an image forming system including an original feeder 11, a staple sorter 21 and a digital copying machine 10 connected to the staple sorter 21.

In the following construction, the input unit 101, the processing unit 102, the output unit 103 and the operation display unit 104 corresponds to the image reader IR, the memory unit 30, the printer PR and the sorter 21, and the operation panel 15, (respectively.

In the digital copying machine 10, information is input by a user's operation of the operation panel 15 (see FIG. 9) in order to form images. Depending on the input information, the automatic original feeder 11 disposed on the upper portion of the digital copying machine 10 feeds a sheet of original from a bundle of originals placed on a certain original supplying tray onto a platen glass one by one. After the reading processing of the original on the platen glass, the automatic original feeder 11 discharges the original on the platen glass to an original discharge tray.

The digital copying machine 10 forms the image of the original on a paper. The paper on which the image is formed is transferred to the staple sorter 21 to be discharged on a non-sort tray 22 or on a discharging bin of a bin assembly 23 of the staple sorter 21, which will be mentioned later.

Figure 7:
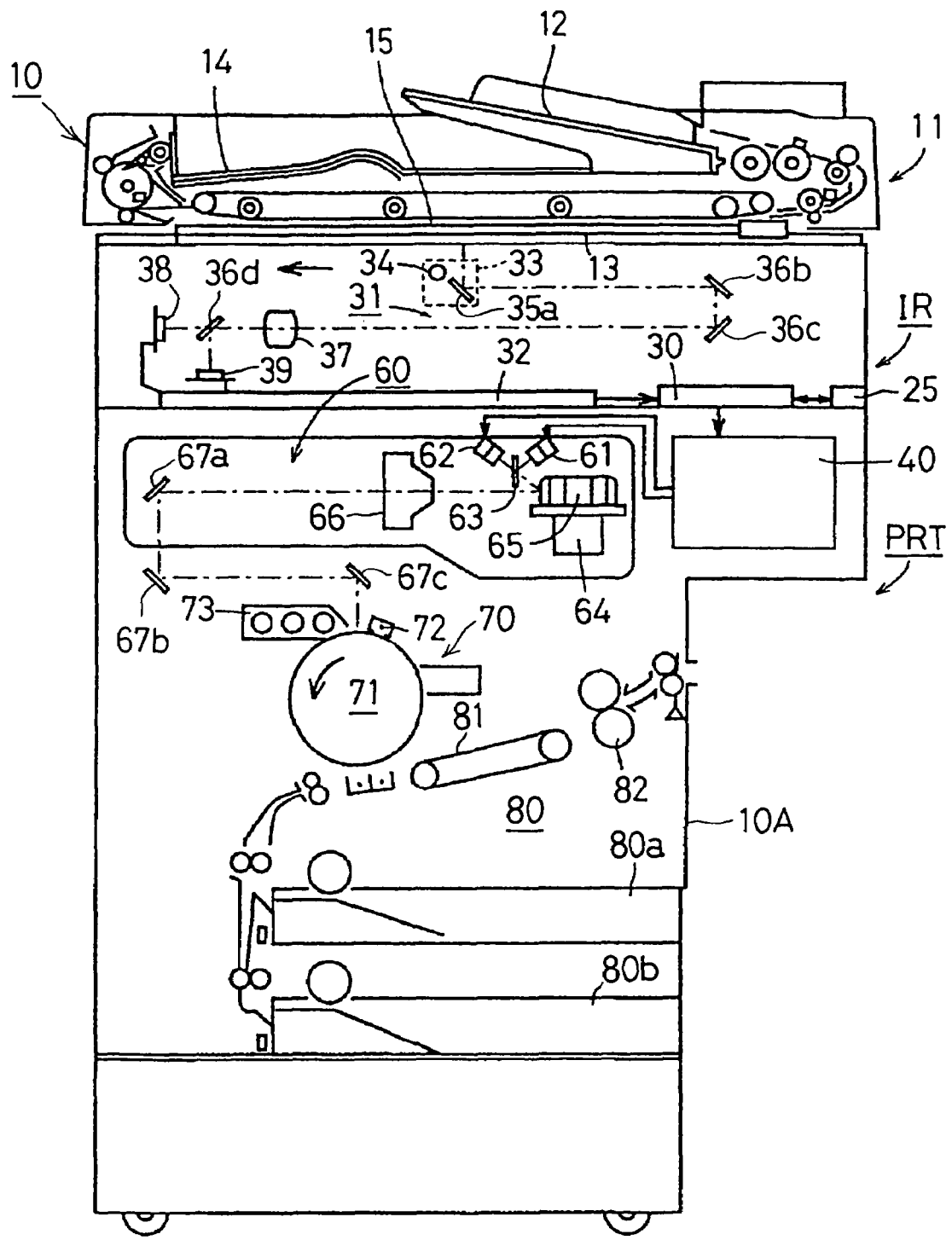
FIG. 7 is a schematic cross-sectional view showing the digital copying machine.
Figure 8:
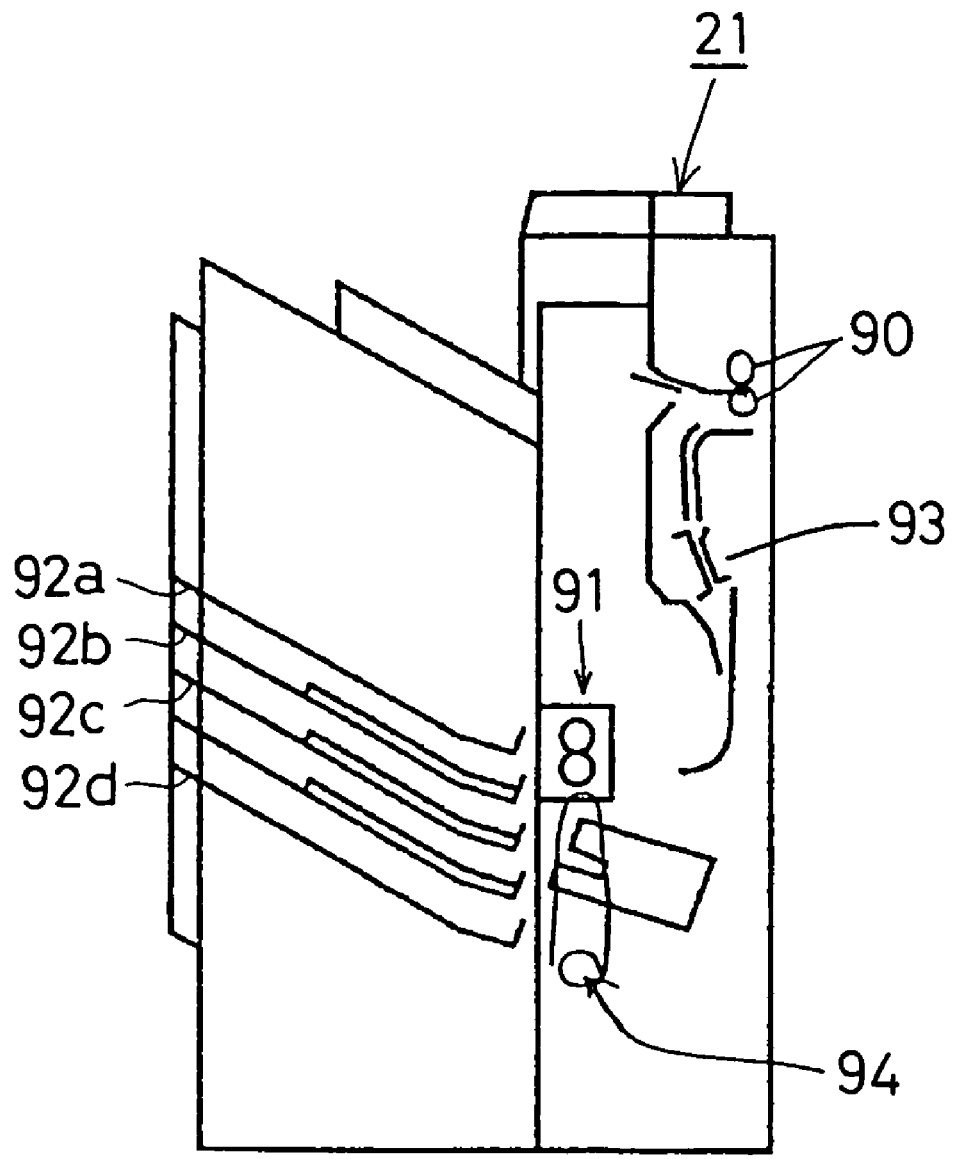
FIG. 8 is a schematic front view showing a staple sorter in the image forming system.

FIG. 7 is a schematic cross-sectional view showing the digital copying machine 10.

The digital copying machine 10 includes as major elements an automatic original feeder 11, an image reader IR, a memory unit 30, a printer PRT, an operation panel 15 and an external input/output controller 25. The automatic original feeder 11 is disposed on the apparatus body 10A, feeds the original and turns the original over if necessary. The image reader IR reads characters on the original to create image data. The memory unit 30 temporarily stores the input obtained by the image reader IR. The printer PRT prints characters on a paper based on the input data stored in the memory unit 30. The operation panel 15 operates various inputs. The external input/output controller 25 receives data from an external device or sends data to an external device.

In the automatic original feeder 11, the original set on the original feeding tray 12 is automatically set on the reading position on the platen glass 13 from the lower-most page in response to a print command. After the image reader IR reads the original, the original is ejected to the ejection tray 14.

The image reader IR includes a scan system 31 and an image signal processor 32. In the scan system 31, the original placed at the reading position is exposed to the exposure lamp 34 fixed to the scanner 33 which moves below the original. The reflected light from the original is guided to the photoelectric converters 38 and 39 via the reflecting mirrors 35a, 36b and 36c and the collective lens 37. The photoelectric converters 38 and 39 includes, for example, CCD arrays, and generates electric signals. The electric signals generated by the photoelectric converters are supplied to the image signal processor 32 as image data. In the image signal processor 32, the input signals are subjected to image processing, such as binarization, image correction, enlargement or reduction, and image editing. The processed image data are stored in the memory unit 30, and then translated by performing a character sequence conversion or the like in a character recognition processing.

The printer PRT includes a print processor 40, an optical system 60, an image forming system 70, and a paper transporting system 80. The printer processor 40 drives the optical system 60 based on the data read from the memory unit 30. In the optical system 60, semiconductor lasers 61 and 62 generate laser beams based on the signals controlled by the printer processor 40. These laser beams are combined into a single beam by a dichroic mirror 63, reflected by a polygon mirror 65 which is A rotated a motor 64, and guided to a photosensitive drum 71 of the imaging forming system 70 via a main lens 66.

In the imaging forming system 70, the photosensitive drum 71 has been electrically charged by a charger 72 in advance. The laser beam guided from the optical system 60 irradiates the charged drum 71, whereby an electrostatic latent image is formed on the photosensitive drum 71. A developer 73 forms a toner image on the electrostatic latent image. The toner image on the photosensitive drum 71 is transferred onto the copy paper which was supplied from the paper-supply cassette 80a or 80b of the paper transporting system 80. The copy paper which bears the toner image is carried by the transporting belt 81 to fixing rollers 82, by which the toner image is thermally fixed to the copy paper with pressure. Finally, the paper is ejected toward receiving rollers 90 (see FIG. 8) of the staple sorter 21 connected to the digital copying machine 10.

Thereafter, the staple sorter 21 receives the paper ejected from the digital copying machine 10 via the receiving rollers 90, and transfers it to a paper transferring gate 91 via a vertical transferring path 93.

The paper transferring gate 91 is movable in an up-and-down direction by the motor 94. The papers are sorted to the discharging bins 92a to 92d via the discharging rollers of the gate.

Figure 9:
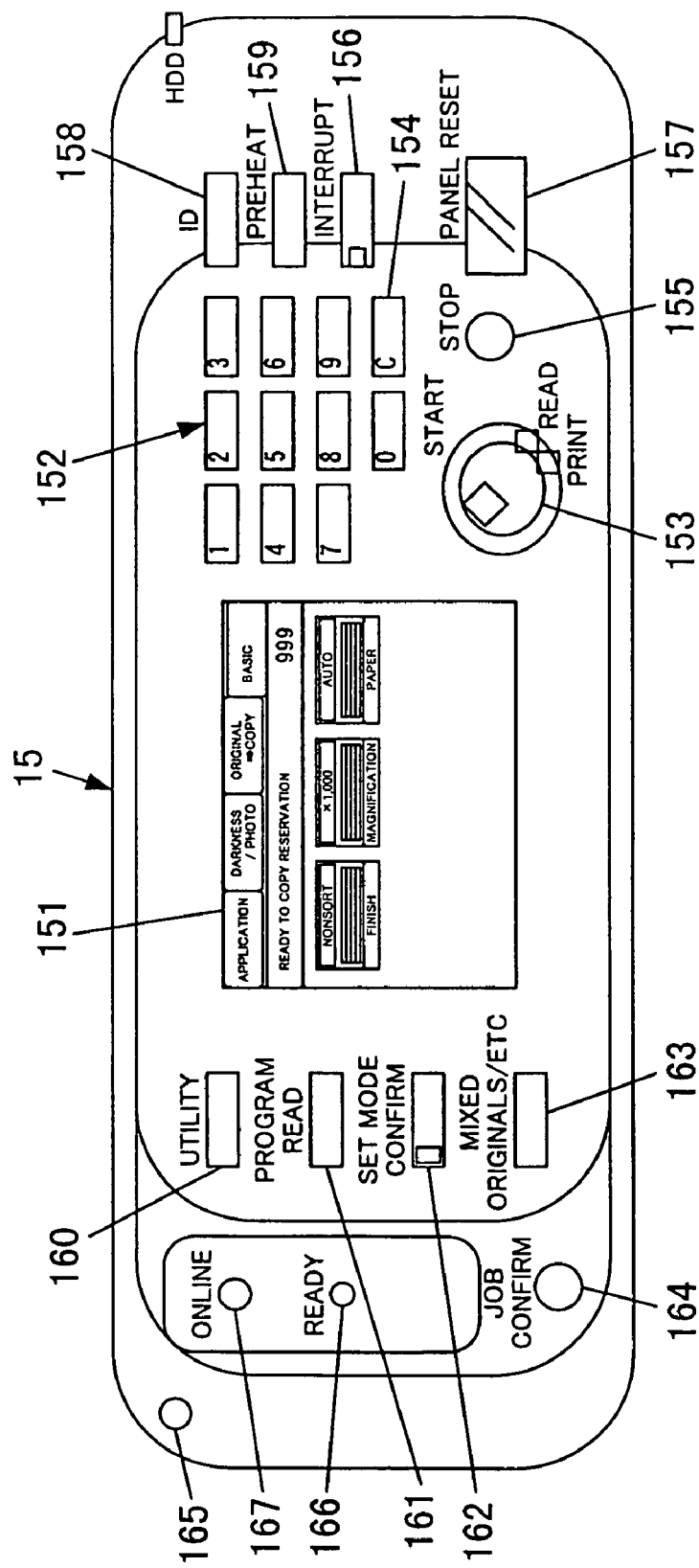
FIG. 9 is a plan view showing an operation panel of the digital copying machine.

FIG. 9 is a plan view showing an operation panel 15 of the digital copying machine 10.

In FIG. 9, provided on the central portion of the operation panel 15 is an LCD display 151 for displaying various modes or messages. Provided on the right side of the display 151 are a ten-key keyboard 152 for inputting the number to be copied or the like, a start key 153 for starting a reading operation and a copying operation, a clear key 154 for initializing various settings, a stop key 155 for stopping the reading operation and the printing operation, an interrupt key 156 for setting to an interruption mode, a panel reset key 157 for initializing all of the modes, an ID code key 158 for selecting a password input screen or the like, a pre-heat key 159 for changing power consumption rate modes, and the like.

Provided on the left side of the LCD display 151 are a utility key 160 for changing the set screen modes such as a programming mode, a program read key 161 for reading a copy mode, a set mode confirmation key 162 for displaying a list of modes, mixed originals/etc. key 163 for changing the set screen mode such as a mixed original mode, a job confirmation key 164 for confirming the job status, an online key 165 for switching modes between an online-mode and an off-line mode, a ready display lamp 166 which shows whether or not data can be transferred, an online display lamp 167 which turns on during the online mode, and the like.

Figure 10:
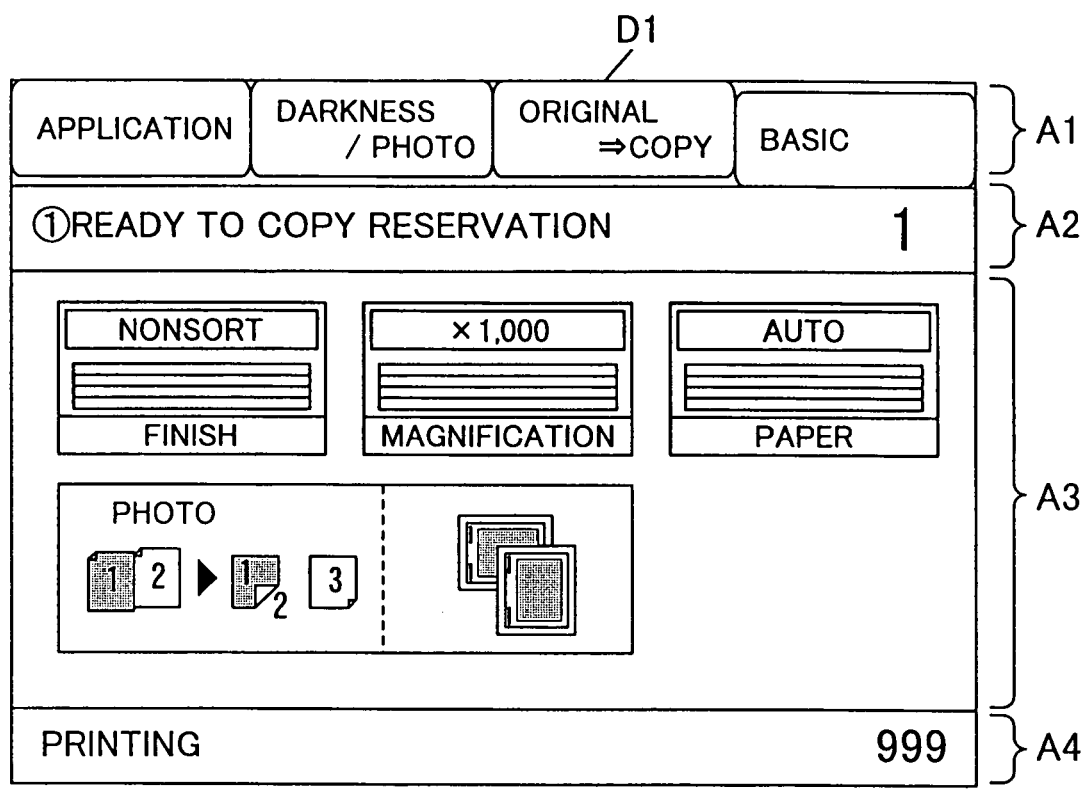
FIG. 10 illustrates a basic screen of the display portion of the operation panel.

FIG. 10 illustrates a basic screen of the LCD display portion 151 of the operation panel 15.

In FIG. 10, this basic screen D1 includes areas A1 to A4. The area A1 is a portion for selecting one of set functions. The area A2 is a portion for displaying messages including setting instructions, warnings, and the like. The area A3 is a portion for displaying various settings and indications. The area A4 is a portion for displaying a back job status operating in the multi-job status.

Figure 11:
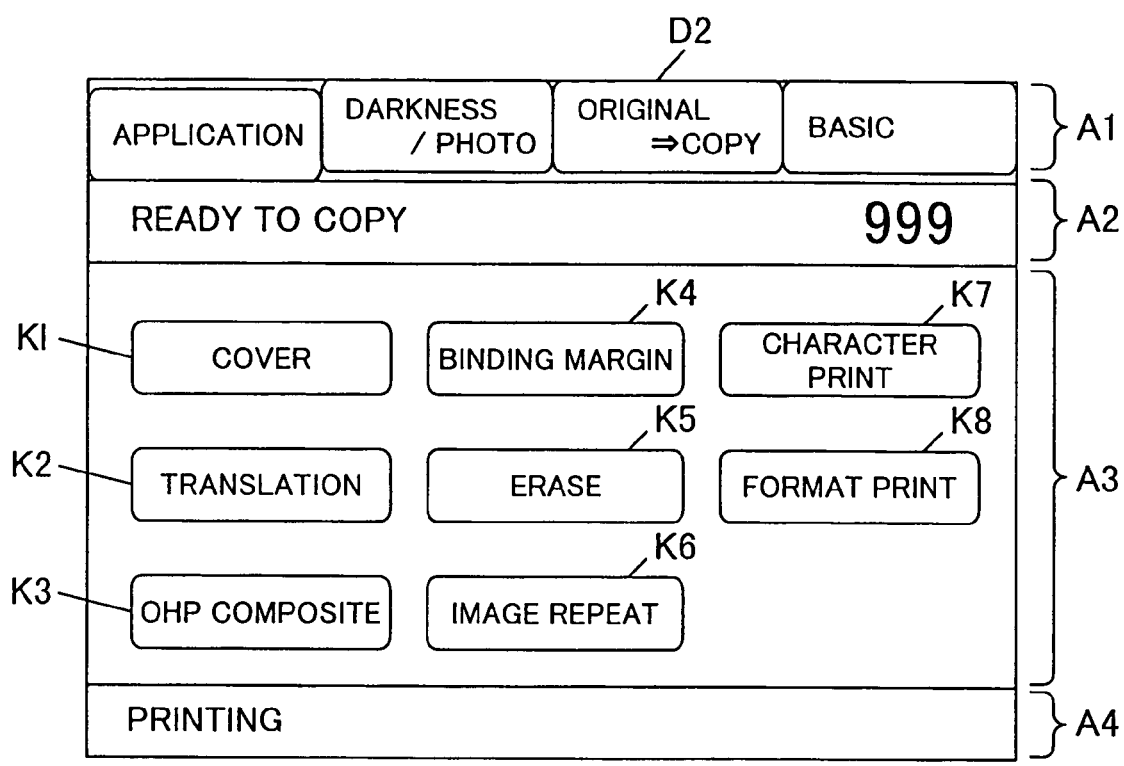
FIG. 11 illustrates an application screen of the display portion.

FIG. 11 illustrates an application screen D2 of the LCD display portion 151.

In the area A3 of this screen D2, a cover key K1, a translation key K2, an OHP composite key K3, a binding margin key K4, an erase key K5, an image repeat key K6, a character printing key K7, a format printing key K8 and the like are displayed together with icons.

Figure 12:
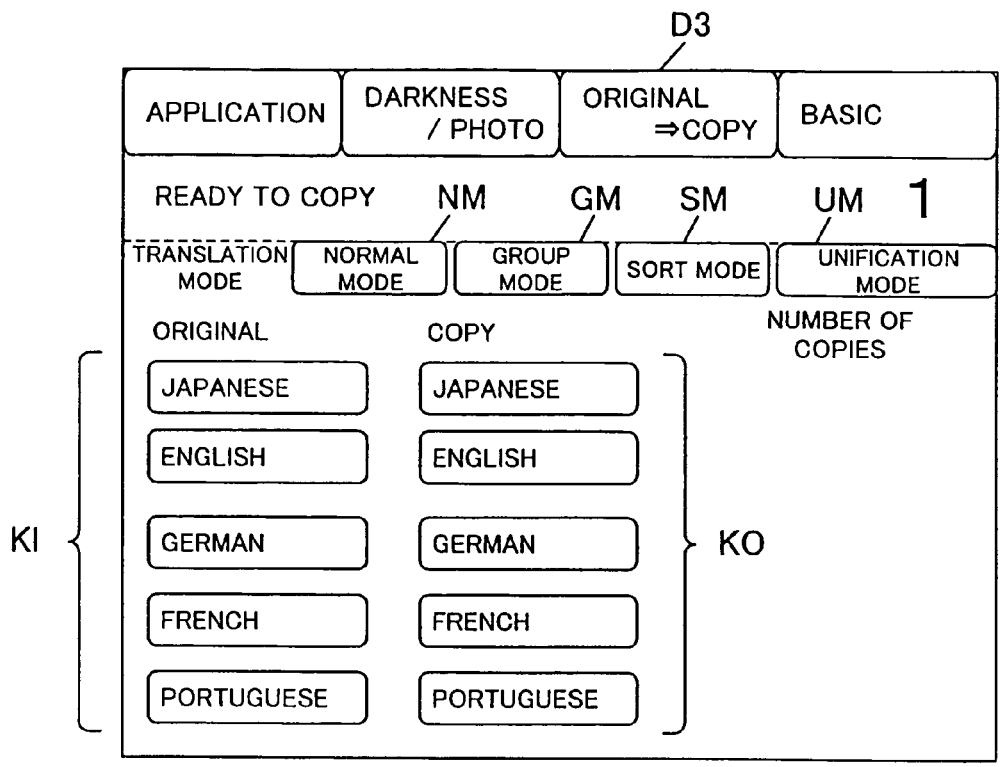
FIG. 12 illustrates a basic screen of a translation mode transferred from the application screen.

In the application screen D2, when the translation key K2 is pressed, the screen D2 is changed into a translation mode basic screen D3 shown in FIG. 12. This translation mode basic screen D3 displays translation mode selection keys including a normal mode key NM, a group mode key GM, a sort mode key SM and a unification mode key UM, a plurality of original language selection keys KI and a plurality of copy language (after-translation-language) selection keys KO.

Figure 13:
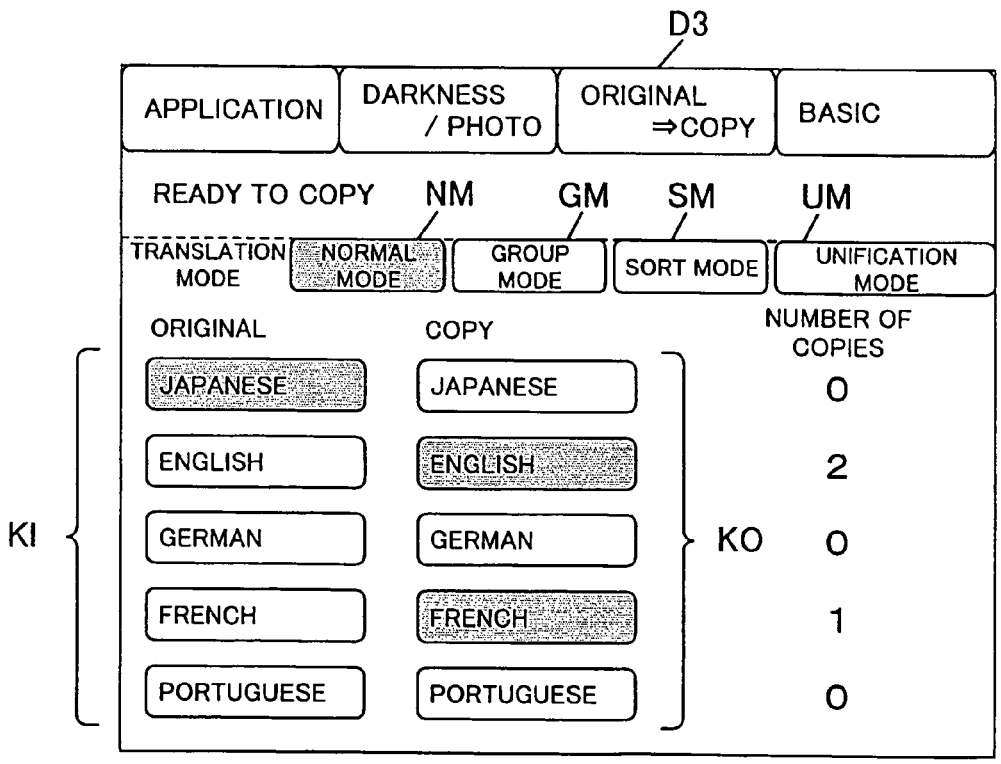
FIG. 13 illustrates a basic screen of a translation mode display in a normal mode.

FIG. 13 illustrates a display status when the normal mode key NM is pressed in the translation mode basic screen D3 shown in FIG. 12.

In this screen, an original language as a before-translation-language is selected (Japanese in FIG. 13) and copy languages as after-translation-languages are selected (English and French in FIG. 13). Furthermore, the number of copies of each selected after-translation-language is set (two sets of English and one set of French in FIG. 13). Thereafter, when the start key 153 in the operation panel 15 is pressed, the translated language data are printed. In this embodiment, two sets of document data in English and one set of document data in French are copied on papers.

Figure 14:
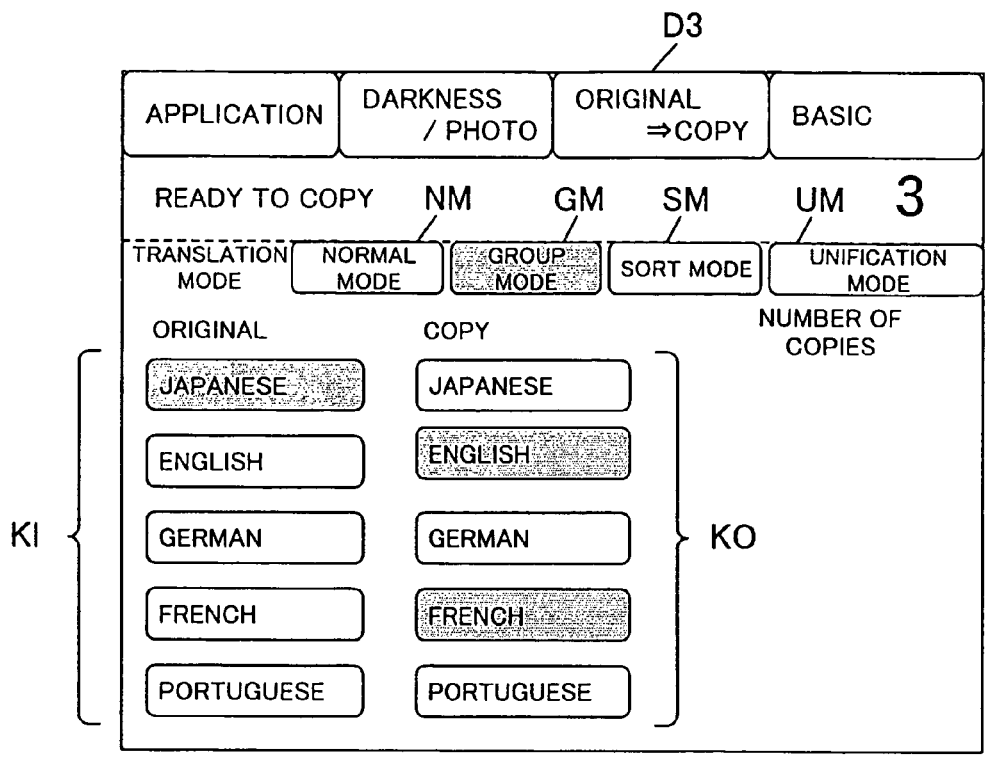
FIG. 14 illustrates a basic screen of a translation mode display in a group mode.

FIG. 14 illustrates a display status when the group mode key GM is pressed in the translation mode basic screen D3 shown in FIG. 12.

In this screen, an original language as a before-translation-language is selected (Japanese in FIG. 14) and copy languages as after-translation-languages are selected (English and French in FIG. 14). Furthermore, the number to be copied for the selected after-translation-language is set (three sets in FIG. 14). Thereafter, when the start key 153 in the operation panel 15 is pressed, the translated language data are output. In this embodiment, the Japanese original is translated into English and French, and three sets of English translation as a group and three sets of French translation as a group are output. When plural pages of Japanese originals are included, three sets of copies each set forming a group which includes plural pages of English translation, and three sets of copies each set forming a group which includes plural pages of French translation, are output.

Figure 15:
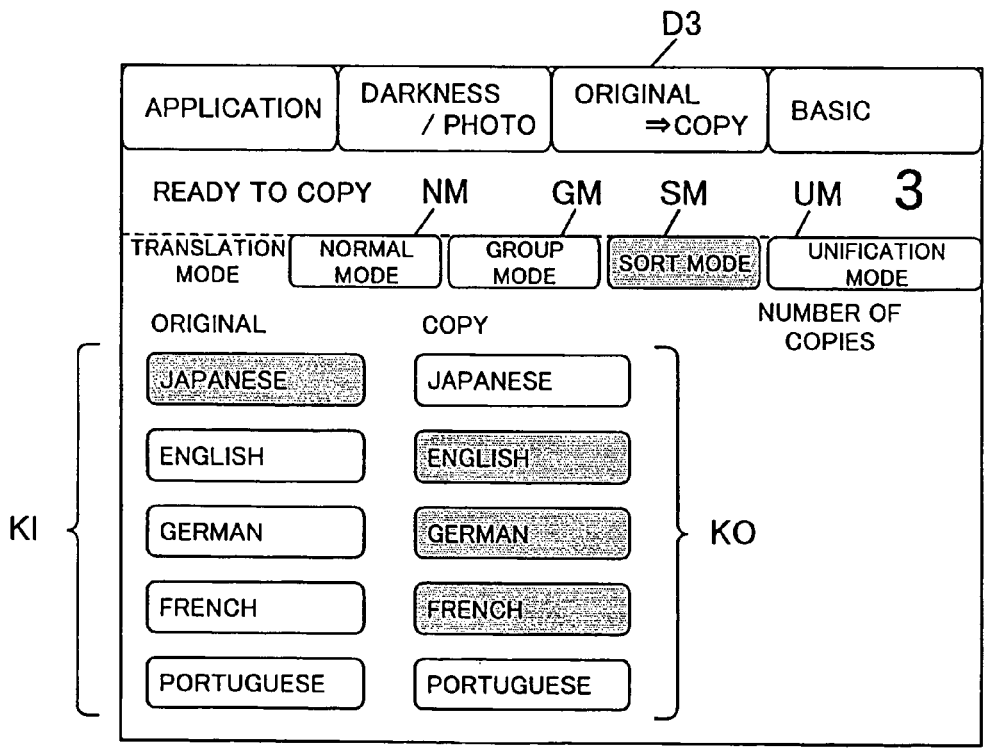
FIG. 15 illustrates a basic screen of a translation mode display in a sort mode.

FIG. 15 illustrates a display status when the sort mode key SM is pressed in the translation mode basic screen D3 shown in FIG. 12.

In this screen, an original language as a before-translation-language is selected (Japanese in FIG. 15) and copy languages as after-translation-languages are selected (English, German and French in FIG. 15). Furthermore, the number to be copied for the selected after-translation-language is set (three sets in FIG. 15). Thereafter, when the start key 153 in the operation panel 15 is pressed, the translated language data are output. In this embodiment, the Japanese original is translated into English, German and French, and a total of three sets of document data each set forming a group which includes English translation, German translation and French translation are output.

Figure 16:
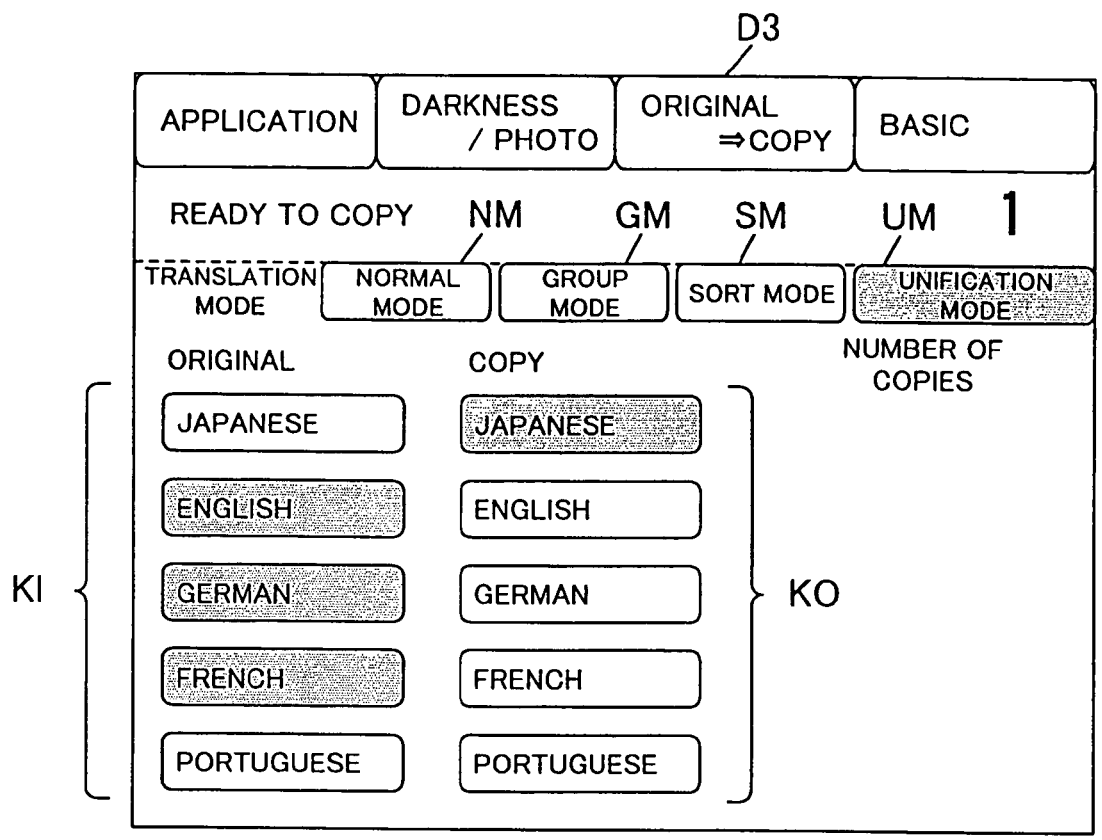
FIG. 16 illustrates a basic screen of a translation mode display in a unification mode.

FIG. 16 illustrates a display status when the unification mode key UM is pressed in the translation mode basic screen D3 shown in FIG. 12.

In this screen, original languages as before-translation-languages are selected (English, German and French in FIG. 16) and a copy language as an after-translation-language is selected (Japanese in FIG. 16). Furthermore, the number to be copied for the selected after-translation-language is set (one set in FIG. 16). Thereafter, when the start key 153 in the operation panel is pressed, the translated language data are copied and output. In this embodiment, the original including English, German and French is translated into Japanese, and one copy of the translation is output. In a case where a plurality of after-translation-languages are set, each translated language is output as a group.

Figure 17:
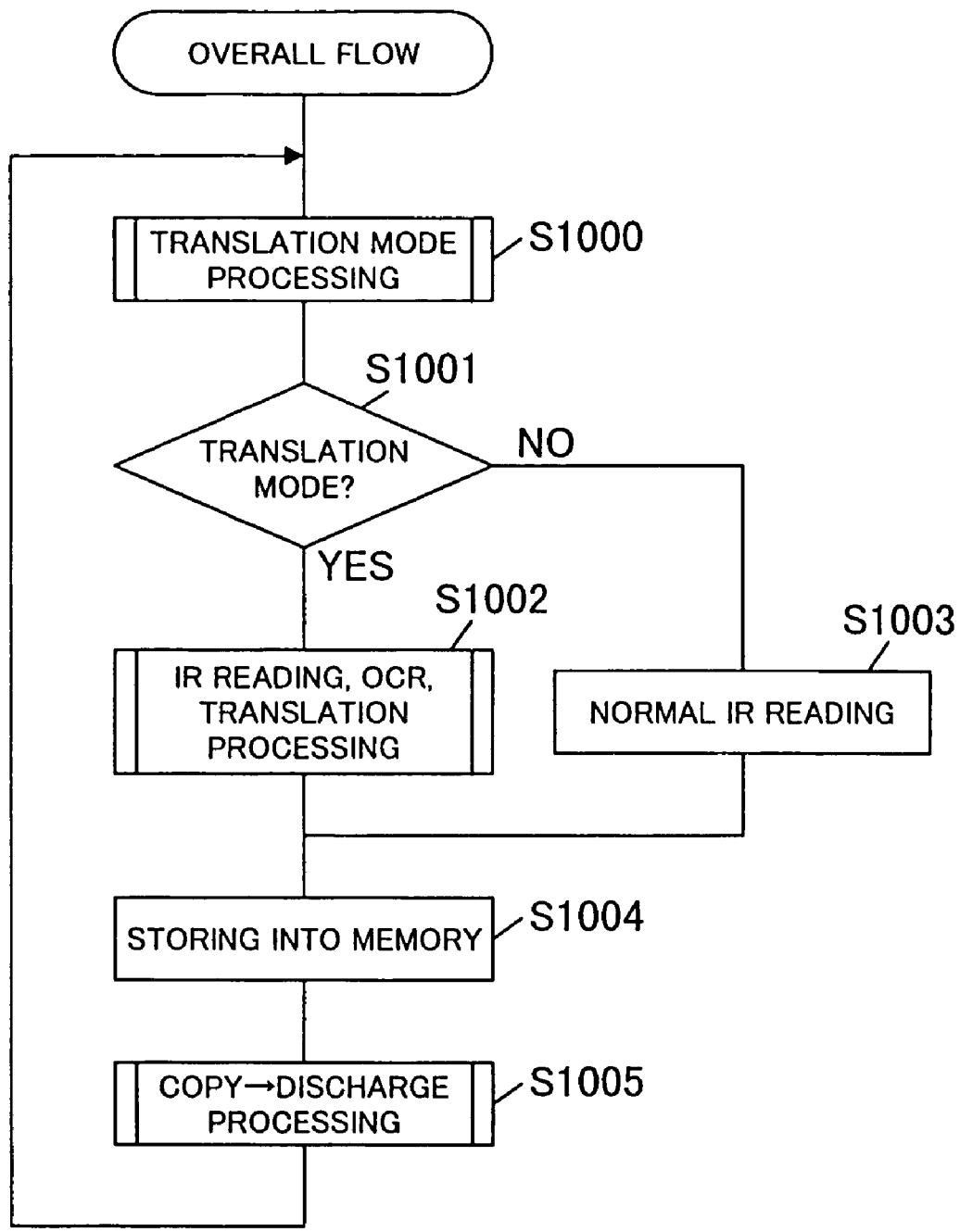
FIG. 17 is a flowchart showing an overall operation of the translating apparatus.

Next, the overall operation of the digital copying machine shown in FIGS. 6 to 8 will be explained with reference to the flowchart shown in FIG. 17. In the following explanation and drawings, the term "step" will be abbreviated to "S".

First, in S1000, a translation mode processing is performed. This processing is a processing for inputting a translation mode or the like by a user, which will be detailed later. Next, in S1001, it is judged whether or not it is in a translation mode. If it is in a translation mode (Yes in S1001), in S1002, an image is read by the image reader IR and subjected to a character recognition processing and a translation processing. These processing will also be detailed later. On the other hand, if it is not in a translation mode (No in S1001), in S1003, a normal image reading is performed by the image reader IR.

Thereafter, in S1004, the translated document data are stored in the memory portion 203. In S1005, a copy operation in after-translation-language and discharge processing are performed. These copy and discharge processing will also be detailed later.

Figure 18:
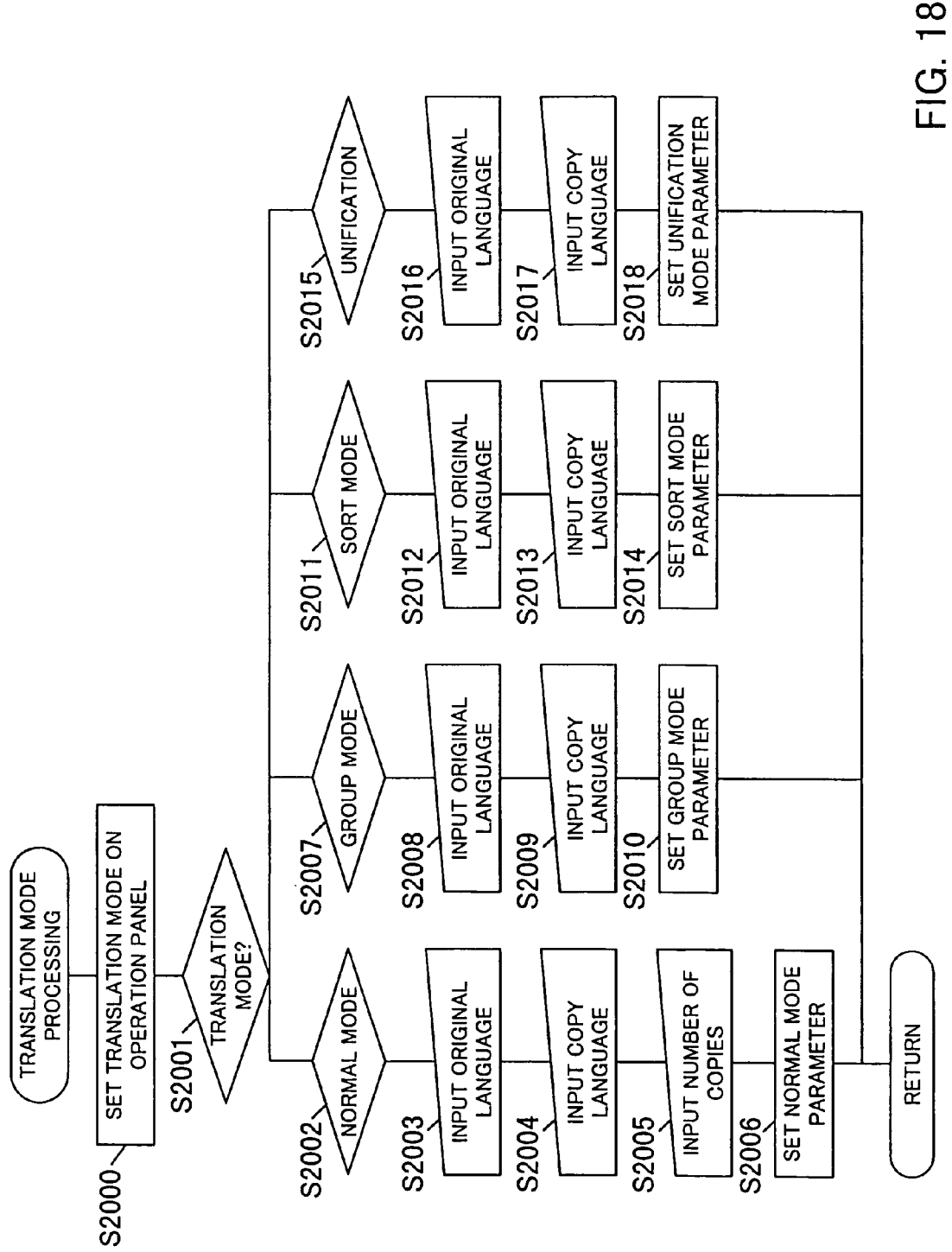
FIG. 18 is a flowchart showing a subroutine of a translation mode process of the translating apparatus.

Next, the subroutine of the translation mode processing in S1000 will be explained with reference to the flowchart shown in FIG. 18.

In S2000, a user sets a translation mode on the operation panel 15, and also inputs the number to be copied. Thereafter, in S2001, the type of the set translation mode is judged. If the translation mode is in a normal mode (S2002), in S2003, an original language is input as a before-translation-language by operating the operation panel 15. In S2004, a copy language as an after-translation-language is input by operating the operation panel 15. In S2005, the number to be copied for each language is input. Then, in S2006, a normal mode parameter is set, and then this routine returns.

If the translation mode is in a group mode (S2007), in S2008, an original language is input. In S2009, a copy language as an after-translation-language is input. In S2010, a group mode parameter is set, and then this routine returns.

If the translation mode is in a sort mode (S2011), in S2012, an original language is input. In S2013, a copy language as an after-translation-language is input. In S2014, a sort mode parameter is set, and then this routine returns.

If the translation mode is in a unification mode (S2015), in S2016, an original language is input. In S2017, a copy language as an after-translation-language is input. In S2018, a unification mode parameter is set, and then this routine returns.

Figure 19:
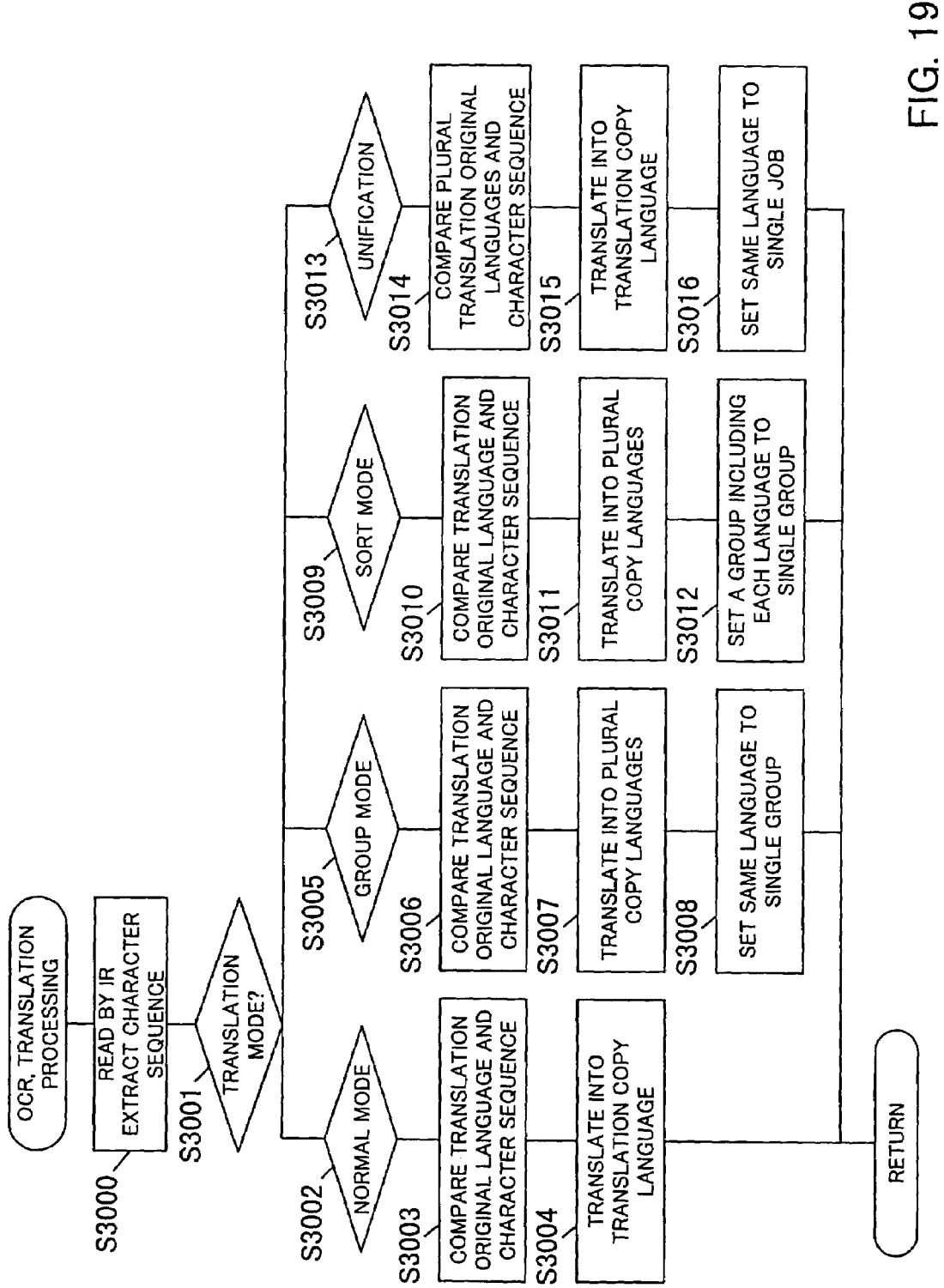
FIG. 19 is a flowchart showing a subroutine of a reading/translating process of the translating apparatus.

Next, the subroutine of the translation processing in S1002 shown in FIG. 17 will be explained with reference to the flowchart shown in FIG. 19.

In S3000, an original is read by the image reader IR, and character sequences are extracted from the read image data. In this text, extracting character sequences means such a processing that character areas are cut out from the original image data and recognizes them as characters. The extracted character sequences data are stored as, for example, text data. In S3001, the type of the set translation mode is judged.

If the translation mode is in a normal mode (S3002), in S3003, the original language and the extracted character sequences are compared. Thereafter, in S3004, the document data are translated into a copy language as an after-translation-language, and then this routine returns. At this time, the document data translated into the copy language are stored in the memory unit 30.

If the translation mode is in a group mode (S3005), in S3006, the original language and the extracted character sequences are compared. Thereafter, in S3007, the document data are translated into a plurality of copy languages as after-translation-languages. In S3008, the translated document data are grouped by after-translation-language, and then stored in the memory unit 30 by the set group unit. Thereafter, this routine returns.

If the translation mode is in a sort mode (S3009), in S3010, the original language and the extracted character sequences are compared. Thereafter, in S3011, the document data are translated into a plurality of copy languages as after-translation-languages. In S3012, the translated document data are grouped such that each group includes each after-translation-language, and then stored in the memory unit 30 by group unit. Thereafter, this routine returns.

If the translation mode is in a unification mode (S3013), in S3014, the plurality of original languages and the extracted character sequences are compared. Thereafter, in S3015, the document data are translated into a copy language as an after-translation-language. In S3016, the translated document data in the same language are set as a single job, and then stored in the memory unit 30 by set job unit. Thereafter, this routine returns.

Figure 20:
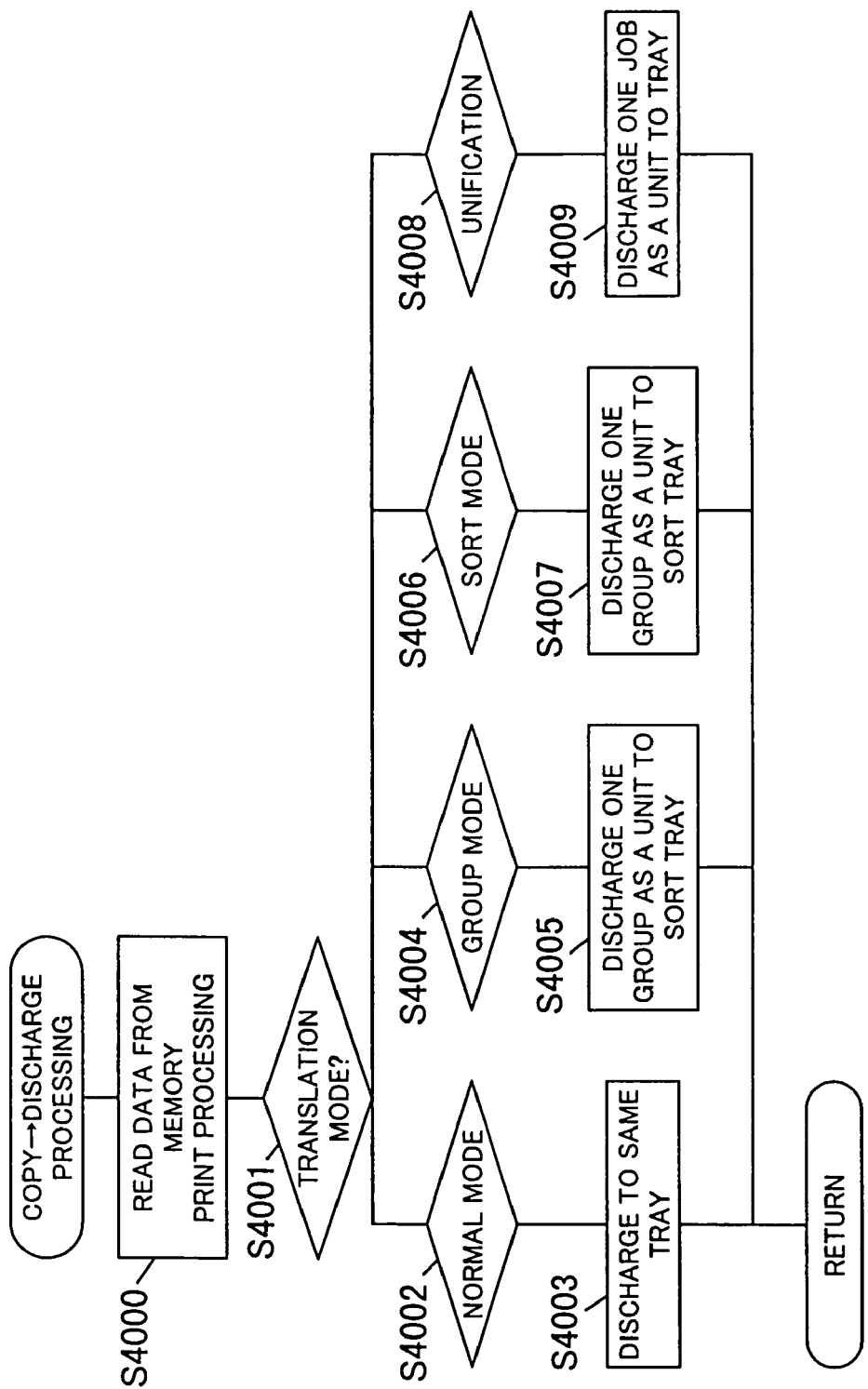
FIG. 20 is a flowchart showing a subroutine of a copying/discharging process of the translating apparatus.

Next, the subroutine of the copy/discharge processing in S1005 shown in FIG. 17 will be explained with reference to the flowchart shown in FIG. 20.

First, in S4000, the printing operation of the translated document data is performed while reading them from the memory unit 30 by the set group unit or job unit. In S4001, the type of the translation mode is judged.

If the translation mode is in a normal mode (S4002), in S4003, the copy papers are discharged onto the same tray, and then this routine returns. Therefore, the set number of copies of the each specified translation language is discharged onto the same tray.

If in a group mode (S4004), in S4005, the copy papers are discharged to the sort tray by one group as a unit, and then this routine returns. Therefore, the after-translation-languages are discharged to the sort tray by each language as one group.

If in a sort mode (S4006), in S4007, the copy papers are discharged to the sort tray by one group as a unit, and then this routine returns. Therefore, the copies are discharged to each sort tray by group including each after-translation-language.

If in a unification mode (S4008), in S4009, the copy papers are discharged to the tray by one job as a unit, and then this routine returns. Therefore, the copies of a single language are discharged to the tray. In this case, if a plurality of after-translation-language are set, the copies are discharged to the sort tray by each language.

In the above-mentioned embodiments, the translation apparatus is applied to a copying machine and the document data after translation are printed and discharged by group unit or job unit. However, the present invention is not limited to the above, and allows to output the translated document data as electric data to an external apparatus such as a computer by group unit or job unit. Furthermore, the translated document data may be output on a display by group unit or job unit.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. A translating apparatus of an image forming system, comprising:
   a translating unit of the image forming system for translating document data into another language;
   an output unit for outputting the translated document data translated by said translating unit in printed form;
   a mode setting unit for setting the translating apparatus in a first mode or a second mode; and
   a controller of the image forming system;
   wherein, in a case where the first mode is set, said controller controls said translating unit so as to translate the document data into a plurality of languages different from one another and different from an original language of the document data, and controls said output unit so as to output the translated document data by language groups of printed documents, the language of each language group of printed documents consisting of one of the plurality of languages, and
   wherein, in a case where the second mode is set, said controller controls said translating unit so as to translate the document data into a plurality of languages different from one another and different from the original language of the document data, and controls said output unit so as to output the document data by groups, each group of the document data comprising a printed document in the original language and printed documents of the translated document data translated in each of the plurality of languages with each of the printed documents being distinct from one another.

2. The translating apparatus as recited in claim 1, wherein said output unit further includes a sorter to sort the printed documents in to the respective groups.

3. The translating apparatus as recited in claim 1, wherein said output unit further includes a display for displaying the translated document data.

4. The translating apparatus as recited in claim 1, further comprising an operation unit for specifying an original language and a plurality of languages to be translated.

5. A translating apparatus of an image forming system, comprising:
- a translating unit of the image forming system for translating document data of a document into another language;
- an output unit for outputting the translated document data translated by said translating unit;
- a mode setting unit for setting the translating apparatus in a prescribed mode; and
- a controller of the image forming system;
- wherein, in a case where the prescribed mode is set and the document data of the document includes a plurality of different languages, said controller controls said translating unit so as to translate the document data into at least one language, and controls said output unit so as to output the translated document data and the original language by groups, each group of the translated document data and the original language comprising a printed document in one of the original languages and printed documents of the translated document data translated in each of the plurality of languages with each of the printed documents being distinct from one another.

6. The translating apparatus as recited in claim 5, wherein said output unit includes a printing device for printing the translated document data on a sheet.

7. The translating apparatus as recited in claim 5, wherein said output unit includes a display for displaying the translated document data.

8. The translating apparatus as recited in claim 5, further comprising an operation unit for specifying a plurality of original languages and at least one language to be translated.

9. The translating apparatus as recited in claim 8, wherein, in a case where a plurality of languages to be translated are specified by said operation unit, said controller controls said translating unit so as to translate each original language into the plurality of languages to be translated, and controls said output unit so as to output the plurality of translated languages by groups, the translated language of each group being different from one another.

10. A translating apparatus of an image forming system, comprising:
- a translating unit of the image forming system for translating document data into another language;
- an output unit for outputting the translated document data translated by said translating unit in printed form;
- an operation unit for setting a number to be output; and
- a controller of the image forming system;
- wherein, said controller controls said translating unit so as to translate the document data in an original language into a first language and a second language, each being different from the original language, and controls said output unit so as to output the document data translated into the first and second languages as a common group of printed documents, said controller further controls said output unit to repeatedly output the common group of printed documents by the number set by said operation unit.

11. The translating apparatus as recited in claim 10, wherein said output unit further includes a display for displaying the translated document data.

12. A translating apparatus of an image forming system, comprising:
- translating unit of the image forming system for translating input document data into another language;
- an output unit for outputting the translated document data translated by said translating unit; and
- a controller of the image forming system;
- wherein, when said input document data includes a first document data written in a first language and a second document data written in a second language, said controller controls said translating unit so as to translate said input document data written in the first language into the second language and translate said input document data written in the second language into the first language, and controls said output unit so as to output the translated input document data and the first and second language data by groups, the first group of the translated document data and the first document data comprising a printed document in the first language and a printed document of the translated document data translated into the first language from the second language and a second group of the translated document data and the second document data comprising a printed document in the second language and a printed document of the translated document data translated into the second language from the first language.

13. The translating apparatus as recited in claim 12, further comprising an operation unit for specifying a translated language, wherein, in a case where a third language and a fourth language are specified as a language to be translated, said controller controls said translating unit so as to translate each of the first document data and the second document data into the third language and the fourth language, and control said output unit so as to output the first and second document data translated into the third language as a group and the first and second document data translated into the fourth language as a group.

* * * * *